United States Patent [19]

Parish et al.

[11] Patent Number: 4,777,522
[45] Date of Patent: Oct. 11, 1988

[54] NONSTANDARD VIDEO SIGNAL DETECTOR HAVING H-SYNC TO SUBCARRIER PHASE DETECTION

[75] Inventors: Robert W. Parish, Gaston; Bruce J. Penney, Portland, both of Oreg.

[73] Assignee: Tektronix, Inc., Beaverton, Oreg.

[21] Appl. No.: 93,287

[22] Filed: Sep. 4, 1987

[51] Int. Cl.⁴ .......................... H04N 9/44; H04N 9/89
[52] U.S. Cl. ...................................... 358/17; 358/158; 358/19
[58] Field of Search ................. 358/17, 19, 21 R, 148, 358/158, 320

[56] References Cited

U.S. PATENT DOCUMENTS 4,335,403  6/1982  Srivastava ........................... 358/148
4,454,531  6/1984  Elmis et al. ........................... 358/17
4,503,455  3/1985  Oshima ................................ 358/19
4,504,862  3/1985  Achtstaetter ......................... 358/17
4,635,099  1/1987  Nicholson et al. .................... 358/17

Primary Examiner—John W. Shepperd
Attorney, Agent, or Firm—Francis I. Gray

[57] ABSTRACT

A heterodyne color signal recognition circuit generates an error signal for each horizontal line of an input video signal for which the phase relationship of the horizontal sync pulse and color subcarrier burst exceeds a given phase relationship by a predetermined tolerance. The error signals are summed over a video field to produce a preliminary non-direct color signal for the video field. Preliminary non-direct color signals for successive video fields are digitally filtered to generate a non-direct color signal indicative of a heterodyne color signal source, the non-direct color signal being used to automatically switch in a time base corrector between the input video signal and further video processing.

6 Claims, 4 Drawing Sheets

NONSTANDARD VIDEO SIGNAL DETECTOR HAVING H-SYNC TO SUBCARRIER PHASE DETECTION

BACKGROUND OF THE INVENTION

The present invention relates to time base correction for video tape recorders (VTR), and more particularly to a heterodyne color signal recognition circuit to provide automatic time base correction mode selection in a video processor.

A video tape recorder (VTR) is an electro/mechanical system in which a quality video signal from a camera or off a remote feed is recorded on an elastic ribbon of tape which is moved back and forth between spinning components. Due to the tolerances of the tape and mechanical components the video signal from the VTR on playback has time base instability. In many broadcast VTRs the video signal is recorded directly onto the tape, maintaining the phase relationship between the color subcarrier and the horizontal sync (455/2). However less expensive VTRs separate the luminance and chrominance components. The chrominance components are stripped by a filter and heterodyned to a lower frequency for recording. This "color-under", or "heterodyne", technique effectively eliminates the phase relationship between the color subcarrier and horizontal sync.

A time base corrector (TBC) is placed between the VTR and the rest of a video system to remove the time base errors induced into the recorded video signal by the stretching and slipping of the tape as it moves past the record/playback heads and by the tolerances of the spinning components, particularly the record/playback head scanner. Some VTRs include the TBC as an integral part of the VTR system. However in other VTR systems the TBC is separate and may even be shared among a number of VTRs and other video sources. Since the characteristics of the various video sources may be different, the TBC must be switched between different modes of processing. This mode switching has conventionally been done manually depending upon whether the input signal is a stable signal from a direct feed source, a recorded signal from a direct color VTR source, or a heterodyned signal from a color-under VTR source. Use of incorrect processing may result in an improper output video signal or degraded video signal quality.

A first attempt at automatic recognition of a heterodyne VTR video source was to form an electronic window from an oscillator signal locked to the video signal subcarrier. The electronic window is established about where the leading edge of the horizontal sync pulse of the composite sync is predicted to be. For each sync pulse which is outside the window an up/down counter is incremented depending upon whether the sync pulse precedes or succeeds the window. For low frequency time base errors generally all the sync pulses which fall outside the window are at one side, i.e., are cumulative. The absolute value from the up/down counter over a selected number of video lines is compared with a threshold value. When the threshold value is exceeded in succeeding video fields, a non-direct color indicator is generated to switch in the TBC circuit for the video signal. However, especially with the new VTRs which eliminate the low frequency problem, the sync pulses may occur on both sides of the window throughout the video field due to high frequency time base errors, resulting in an absolute value from the up/down counter which does not exceed the threshold value. Thus the non-direct color source, i.e., heterodyned VTR, is not detected. Then the operator is relegated to manually switching in the TBC whenever a heterodyned VTR is used as a video source.

What is desired is a heterodyne color signal recognition circuit which automatically detects the presence of a non-direct, heterodyned color source under all conditions.

SUMMARY OF THE INVENTION

Accordingly the present invention provides a heterodyne color signal recognition circuit for automatically detecting the presence of a non-direct color video source. Phase errors between the composite sync and the color subcarrier of a video signal from a video signal source are detected using an electronic window. Both low frequency and high frequency sync timing errors are accumulated in an error counter. If the number of errors accumulated in the error counter exceed a predetermined value for a video field, a preliminary indication of the signal source being the non-direct color source is generated. If the preliminary indication continues for three consecutive fields, or for three consecutive odd or even fields, the non-direct color video source is identified and used to select a time base correction mode for heterodyne color signal correction. After the non-direct color video source is identified and the preliminary indication is not received for four consecutive fields, then the non-direct color indication is removed and another time base correction mode is selected.

The objects, advantages and novel features of the present invention will be apparent from the following detailed description when read in conjunction with the appended claims and attached drawing.

DESCRIPTION OF THE PREFERRED EMBODIMENT

Figure 1:
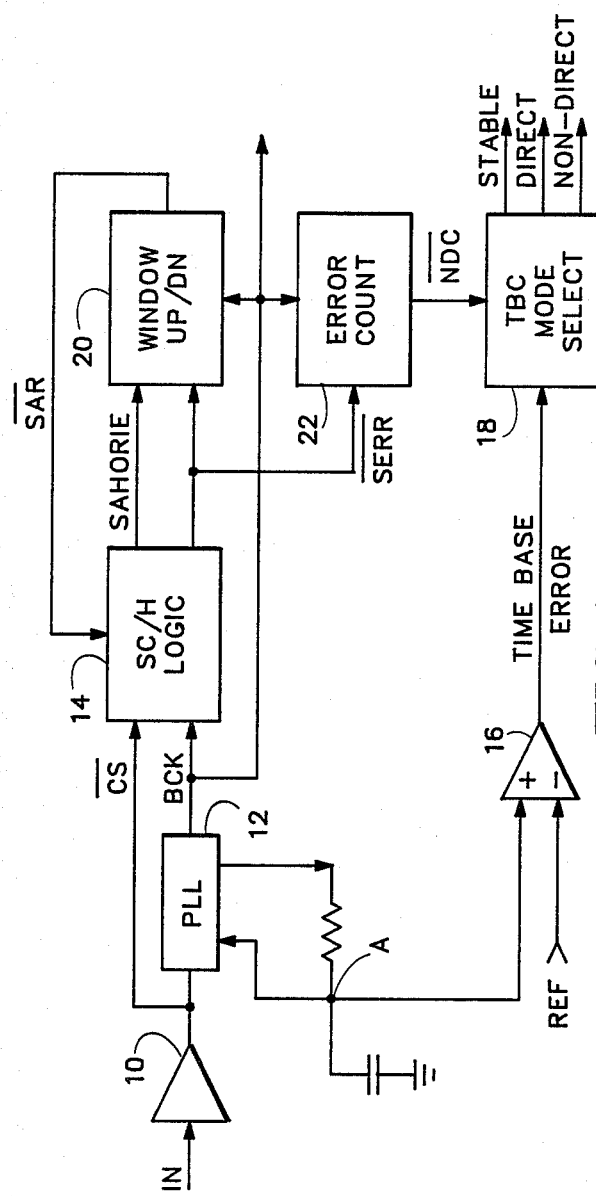
FIG. 1 is a block diagram of a heterodyne color signal recognition circuit according to the present invention.

Referring now to FIG. 1 an input video signal IN from a video source is input to a buffer amplifier 10. The output of the buffer amplifier 10 is input to a phase locked loop (PLL) 12 and to a subcarrier/horizontal sync (SC/H) logic circuit 14. The PLL 12 generates an output clock BCK which is synchronized to the color subcarrier of the input signal IN. Variations in the color subcarrier frequency appear at node A as a control voltage which is used to correct the oscillator frequency of the PLL 12. The variations at node A are also input to a comparator 16 to which a reference voltage REF, representative of the nominal voltage at node A, is input. The output of the comparator 16 is a time base error signal. The time base error signal is input to a time base corrector (TBC) mode selector 18. The three TBC modes from the TBC mode selector 18 are:

(i) STABLE—indicating that the video input signal is from a direct video feed such as a video camera;

(ii) DIRECT—indicating that the video input signal is from a video tape recorder (VTR) on which input video was recorded directly; and (iii) NON-DIRECT—indicating that the video input signal is from a VTR on which input video was recorded in a heterodyned format such as color-under.

The SC/H logic circuit 14 generates a sync window using the clock BCK, the sync window being generated about the nominal position of the horizontal sync from the composite sync /CS of the input signal. For direct recording VTRs the phase relationship between the composite sync and the color subcarrier is essentially constant so that the horizontal sync pulse occurs within the sync window and no errors are detected. For heterodyned VTRs the phase relationship between the composite sync and the color subcarrier varies. If the variation in phase causes the horizontal sync pulse to fall outside the sync window, then an error signal /SERR is generated from the SC/H logic circuit 14 together with an indication SAHORIZ of whether the horizontal sync pulse occurs before or after the sync window. An up/down counter 20 counts the errors /SERR according to the status of SAHORIZ to provide an average sync error. The errors /SERR also are counted in an error counter 22. If the number of errors for a given portion of a video field, the given portion being determined by a vertical window defining a given number of horizontal lines, exceed a predetermined amount for a predetermined number of consecutive fields, then a non-direct color indicator /NDC is output to the TBC mode selector 18.

Figure 2:
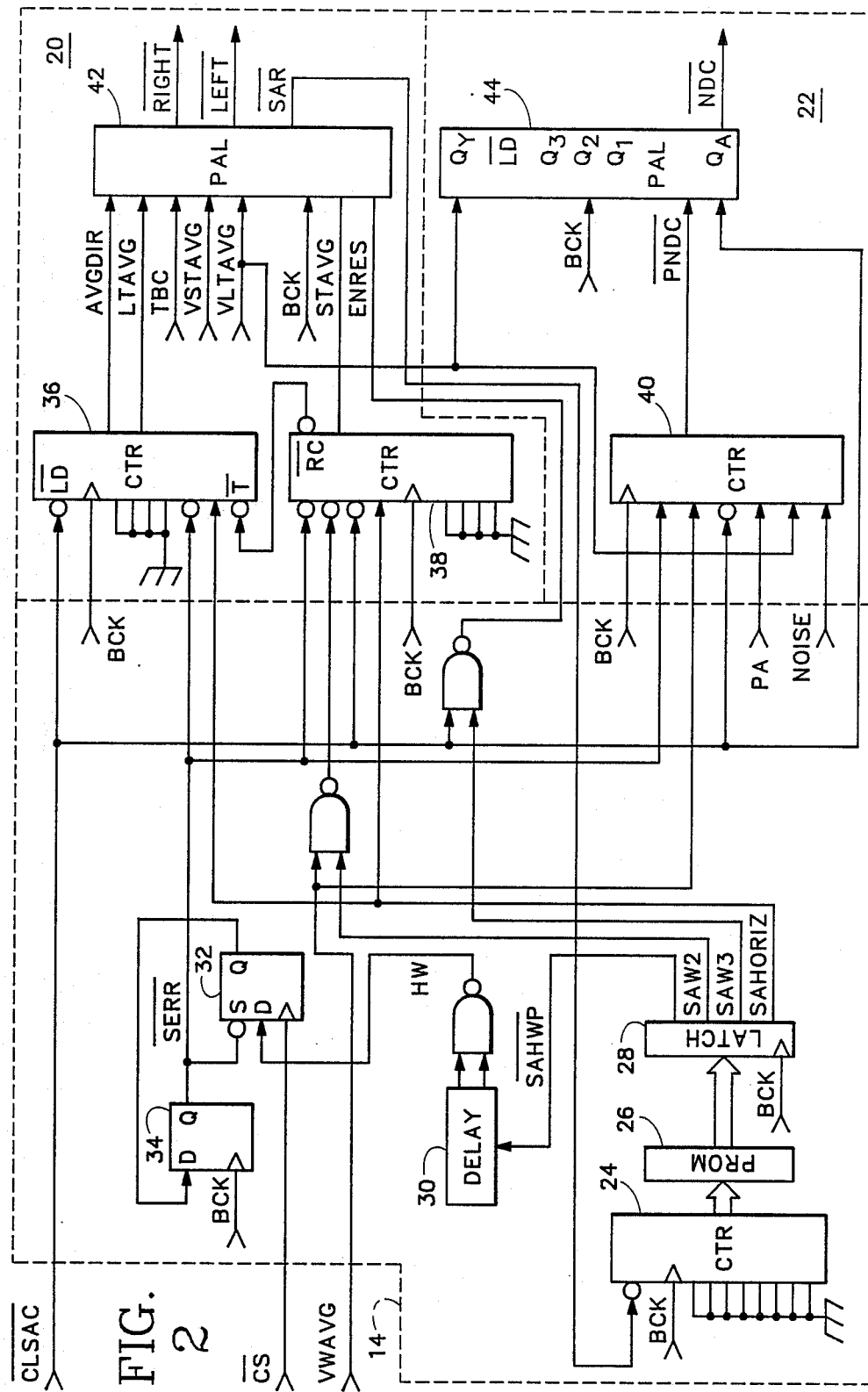
FIG. 2 is a schematic diagram of a portion of the heterodyne signal recognition circuit shown in FIG. 1.

As shown in greater detail in FIG. 2 the clock BCK from the PLL 12 is input to a first counter 24 which counts the clock pulses of BCK until reset by a signal /SAR from the up/down counter 20 at the end of each horizontal line of video data. The output of the first counter 24 is input as an address to a programmable read only memory (PROM) 26. A data word at the output from the PROM 26 corresponding to the address from the first counter 24 is clocked into a latch 28. The data word from the PROM 26 provides a data line SAHWP which is low for all addresses except where the window is desired at the start of the next horizontal line of video data. Since the latch 28 is clocked by BCK, the length of the output from the latch for SAHWP is a function of the period of BCK. To provide a window having a length between multiples of the period of BCK the window signal SAHWP is input to a delay line 30 to lengthen the window pulse. The horizontal window pulse signal HW from the delay line 30 is input to a first flip-flop 32 configured as a D-type. The bit value of the HW signal at the D input of the first flip-flop 32 is transferred to the output Q at the leading edge of the horizontal sync pulse of the composite sync /CS signal applied to the clock input.

Figures 5, 6:
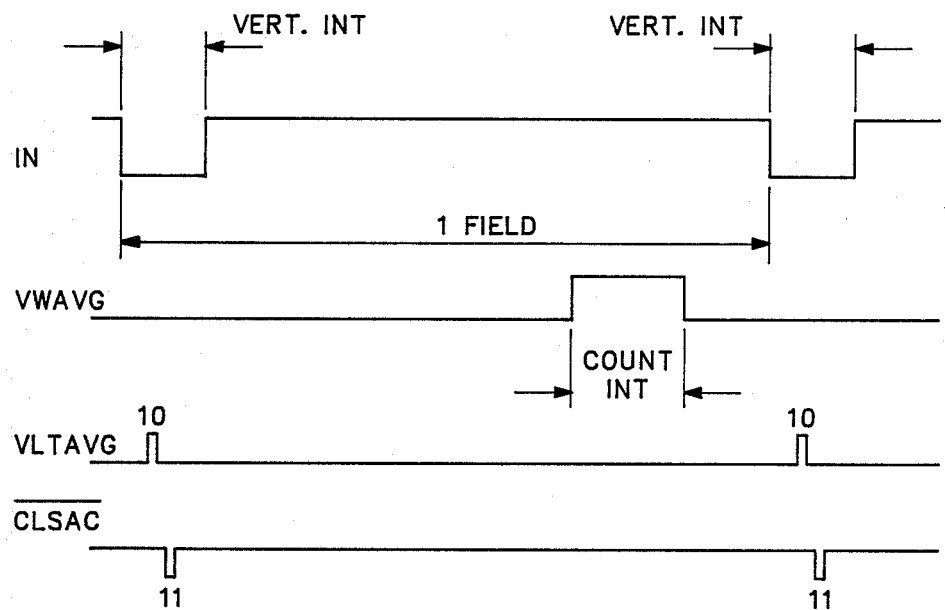
FIG. 5 is a timing diagram for a SC/H logic circuit used by the heterodyne signal recognition circuit of FIG. 2.
FIG. 6 is a timing diagram for the heterodyne signal recognition circuit of FIG. 2.

The output of the first flip-flop 32 is input to a second flip-flop 34 configured as a D-type. The second flip-flop 34 is clocked by BCK and produces at the output Q the error signal /SERR. /SERR is applied to the set terminal S of the first flip-flop 32 to cause the output of the first flip-flop to go high, which in turn on the next BCK clock pulse terminates the error signal, i.e., provides a definite pulse for /SERR. Referring to FIG. 5 if the HW signal is high when the leading edge of horizontal sync from /CS occurs, the output of the first flip-flop 32 is high and on the next pulse of BCK the output of the second flip-flop is high, indicating that the sync pulse occurred within the horizontal window. However if the HW signal is low when the leading edge of horizontal sync from /CS occurs, the output of the first flip-flop 32 goes low and on the next BCK pulse the output of the second flip-flop 34 goes low, indicating that the sync pulse is outside the horizontal window. When the output of the second flip-flop 34 goes low, the first flip-flop 32 is set and the resulting high output from the first flip-flop causes the output of the second flip-flop to return high on the next BCK pulse. /SERR also is input to three counters 36, 38, 40 which are clocked by BCK. The first two counters 36, 38 form an up/down counter which increments for each /SERR pulse from the second flip-flop 34. A signal SAHORIZ from the latch 28 as output by the PROM 26 indicates whether the /SERR pulse results in an increment or a decrement. If SAHORIZ is high when the horizontal sync pulse from /CS occurs, then /SERR increments the up/down counter. If SAHORIZ is low when the horizontal sync pulse from /CS occurs, then /SERR decrements the up/down counter. The output of the up/down counters 36, 38 is input to a programmed array logic (PAL) circuit 42. The output of the PAL 42 provides an indication of the direction of the average phase error (/RIGHT, /LEFT) of the input signal and a reset signal /SAR to the first counter 24 to begin counting for the next horizontal line.

Figure 3:
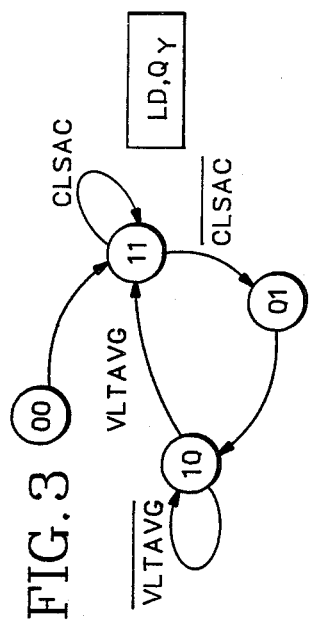
FIG. 3 is a state diagram for a digital filter used by the heterodyne signal recognition circuit of FIG. 2.
Figure 4:
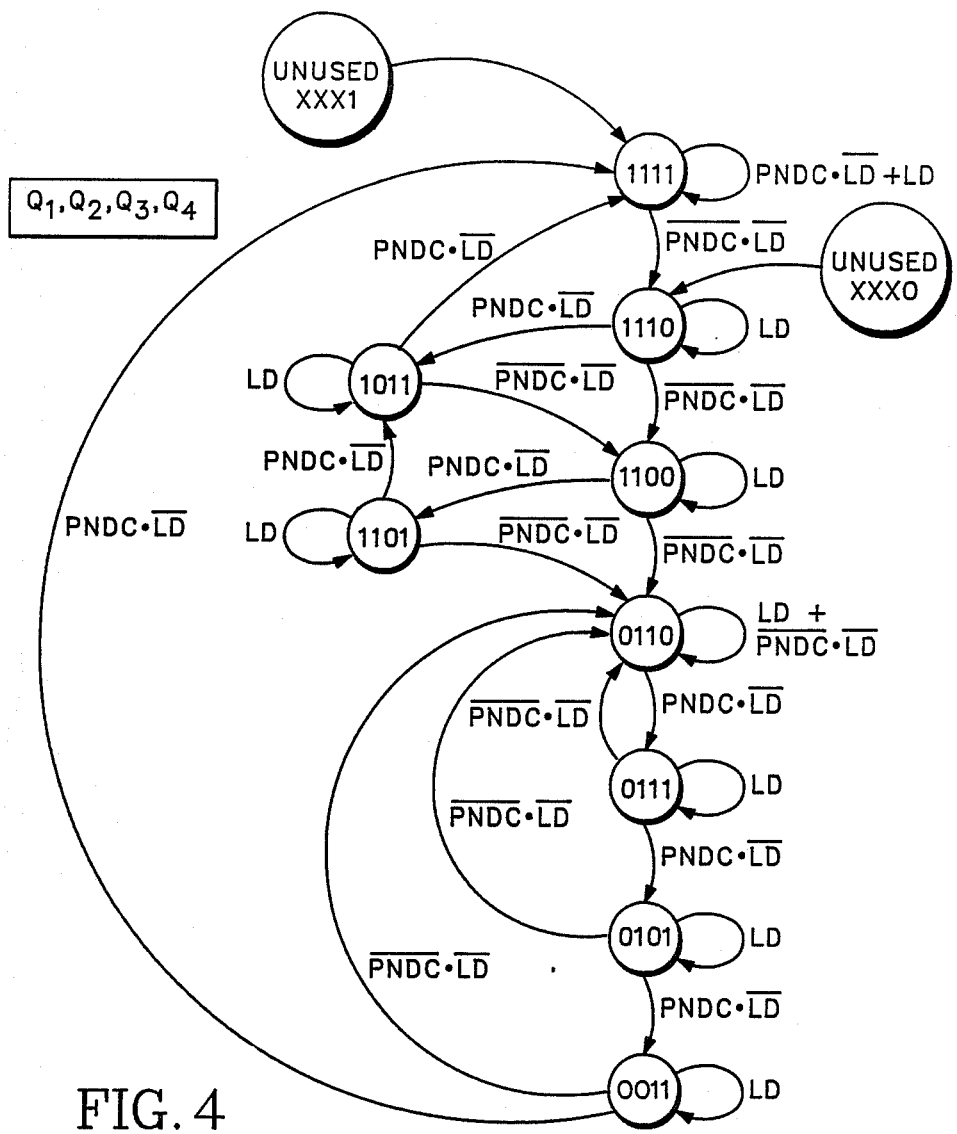
FIG. 4 is a state diagram for a second portion of the digital filter used by the heterodyne signal recognition circuit of FIG. 2.

The counter 40 counts each /SERR pulse for each horizontal line defined by a vertical window VWAVG, regardless of whether the horizontal sync pulse occurs before or after the horizontal window HW. The counter 40 outputs a preliminary non-direct color signal /PNDC when the count reaches a predetermined value before the counter is reset by a reset signal /CLSAC which occurs each video field. /PNDC is input to an error state machine 44, such as a PAL, which acts as a digital filter. Referring now to FIGS. 3 and 4 the operation of the error state machine 44 occurs in two phases. The first state diagram of FIG. 3 is a function of a read signal VLTAVG and the clear signal /CLSAC and affects the LD and Qy outputs. If LD,Qy=00, an unused state, the error state machine 44 changes the state to LD,QY=11. So long as the clear signal is absent (CLSAC), the state remains 11. When the clear signal /CLSAC is received, the state changes from 11 to 01 and then after a given time duration changes to the 10 state which produces a /LD pulse of the given time duration. The error state machine 44 remains in the 10 state so long as no read signal (/VLTAVG) is received. When the read signal VLTAVG is received, the state transitions from 10 to 11 to begin the cycle again. As shown in FIG. 6 the read signal and clear signal occur once each field of video data during the vertical sync interval, with the read signal occurring first and the clear signal occurring one horizontal line later.

The second state diagram of FIG. 4 is a function of the /LD pulse from the first diagram and the /PNDC signal from the counter 40. The Q4 output of the error state machine 44 provides the /NDC signal which indicates the presence as a video input signal of a heterodyned color signal source. The unused states ending in 1 automatically are changed to the 1111 state, and the unused states ending in 0 are automatically changed to the 1110 state. For all other states the state remains unchanged so long as the /LD pulse from the first state diagram is not present. When /LD occurs once per video field, then the output of the counter 40 is checked to determine whether the preliminary non-direct color signal /PNDC is present. If /PNDC is present for three consecutive fields in conjunction with /LD, the states transition from 1111 to 1110 to 1100 to 0110 and the state machine 44 remains in the 0110 state so long as /PNDC is present for each subsequent /LD pulse. However since a video frame is divided into even and odd fields per video frame, phase errors may occur only in alternate fields. In that situation /PNDC occurs every other field so that the states transition from 1111 to 1110 to 1011 to 1100 to 1101 to 0110. Subsequent fields cause the states to transition back and forth between 0111 and 0110. If during the state transitions from 1111 to 0110 there are two or three consecutive fields without /PNDC, the states transition back to 1111 from 1110 via 1011 or from 1100 via 1101 and 1011. /NDC is provided at the output from state 0110 and is held until the error state machine returns to state 1111. To return to state 1111 from 0110 four consecutive fields without /PNDC are required to transition through states 0111, 0101 and 0011. If during the transition from 0110 to 1111 a /PNDC occurs in one of the fields, the state transitions back to 0110 directly from 0111, 0101 and 0011. /NDC is removed when the state is returned to 1111.

Thus the present invention provides a heterodyne color signal recognition circuit by adding all the SC/H phase errors of a video input signal that occur within a predetermined portion of a video field of the input signal, outputting a preliminary non-direct color signal for each field indicating the presence of at least a predetermined number of errors within the field, and digitally filtering the preliminary non-direct color signal to assure at least three consecutive odd and/or even fields having errors to output a non-direct color signal to a time base correction mode selector.

What is claimed is:

1. A heterodyne color signal recognition circuit comprising:
    means for generating an error signal from a horizontal line of a video input signal, the horizontal line having a horizontal sync pulse and a color subcarrier burst in a phase relationship with each other, when the phase relationship exceeds a predetermined tolerance;
    means for summing the error signal with error signals generated from other horizontal lines of a video field to produce a preliminary non-direct color signal for the video field when the sum of the error signals exceeds a predetermined threshold value; and
    means for generating a non-direct color signal from the preliminary non-direct color signal and preliminary non-direct color signals generated for other video fields to indicate that the video input signal is from a heterodyned color signal source.

2. A circuit as recited in claim 1 wherein the error signal generating means comprises:
    means for generating a horizontal window synchronized with the color subcarrier burst, the horizontal window being generated about a predicted position of the horizontal sync pulse and being of a length equal to the predetermined tolerance;
    means for comparing the video input signal with the horizontal window to determine whether the horizontal sync pulse occurs within the horizontal window; and
    means for outputting the error signal when the horizontal sync pulse occurs outside the horizontal window.

3. A circuit as recited in claim 1 wherein the summing means comprises:
    means for counting the horizontal lines for the video field for which the error signal is generated to produce an error value, the horizontal lines being a selected portion of the video field; and
    means for comparing the error value with the predetermined threshold value to generate the preliminary non-direct color signal when the error value exceeds the predetermined threshold value.

4. A circuit as recited in claim 1 wherein the non-direct color signal generating means comprises a digital filter to which the preliminary non-direct color signal is input, the digital filter outputting the non-direct color signal when the preliminary non-direct color signal occurs for a first predetermined number of consecutive video fields and holding the non-direct color signal once output until the preliminary non-direct color signal is absent for a second predetermined number of consecutive video fields.

5. A circuit as recited in claim 1 wherein the non-direct color signal generating means comprises a digital filter to which the preliminary non-direct color signal is input, the digital filter outputting the non-direct color signal when the preliminary non-direct color signal occurs for a first predetermined number of consecutive alternate video fields and holding the non-direct color signal once generated until the preliminary non-direct color signal is absent for a second predetermined number of consecutive video fields.

6. A method for recognizing the source of an input video signal as being a heterodyned color video source comprising the steps of:
    generating an error signal for each horizontal line of the input video signal, each horizontal line having a horizontal sync pulse and a color subcarrier burst in a phase relationship, when the phase relationship exceeds a predetermined tolerance;
    summing the horizontal lines having the error signal over a video field of the input video signal to produce a preliminary non-direct color signal when the sum of the horizontal lines exceeds a predetermined threshold value; and
    generating a non-direct color signal from the preliminary non-direct color signal and preliminary non-direct color signals generated for other video fields to indicate the heterodyned color video source.

* * * * *